United States Patent
Mukainakano

(10) Patent No.: US 12,194,869 B2
(45) Date of Patent: Jan. 14, 2025

(54) IN-VEHICLE POWER SUPPLY SYSTEM, CHARGE/DISCHARGE CONTROL DEVICE, AND VEHICLE

(71) Applicant: SUBARU CORPORATION, Tokyo (JP)

(72) Inventor: Yuya Mukainakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/250,864

(22) PCT Filed: Mar. 28, 2022

(86) PCT No.: PCT/JP2022/014817
§ 371 (c)(1),
(2) Date: Apr. 27, 2023

(87) PCT Pub. No.: WO2023/187858
PCT Pub. Date: Oct. 5, 2023

(65) Prior Publication Data
US 2024/0326610 A1    Oct. 3, 2024

(51) Int. Cl.
*H02J 7/00*    (2006.01)
*B60L 50/40*    (2019.01)
(Continued)

(52) U.S. Cl.
CPC ............ *B60L 50/40* (2019.02); *B60L 50/60* (2019.02); *B60L 58/12* (2019.02);
(Continued)

(58) Field of Classification Search
CPC .......... B60L 50/40; B60L 50/51; B60L 50/61; Y02T 10/62; Y02T 10/64; Y02T 90/14; Y02T 10/7072; Y02T 10/72; Y02T 10/70
(Continued)

(56) References Cited

U.S. PATENT DOCUMENTS

| | | | | |
|---|---|---|---|---|
| 5,710,699 A | * | 1/1998 | King | B60L 50/40 318/139 |
| 2005/0099155 A1 | * | 5/2005 | Okuda | H02J 7/1438 320/162 |
| 2016/0049809 A1 | * | 2/2016 | Kajitani | H02J 7/345 320/118 |

FOREIGN PATENT DOCUMENTS

WO    2014/156564 A1    10/2014

OTHER PUBLICATIONS

International Search Report issued in corresponding International Patent Application No. PCT/JP2022/014817, dated May 17, 2022.

* cited by examiner

*Primary Examiner* — Elim Ortiz
(74) *Attorney, Agent, or Firm* — Rimon P.C.

(57) ABSTRACT

An in-vehicle power supply system includes a first power storage device including one or more lithium ion secondary batteries, a second power storage device connected in parallel to the first power storage device, and a charge/discharge control device. The second power storage device includes lithium ion capacitor groups constituted by a first capacitor group including one or more lithium ion capacitors and a second capacitor group connected in parallel to the first capacitor group and including one or more lithium ion capacitors. The charge/discharge control device controls charging/discharging of the first and second power storage devices to supply electric power to a drive source of a vehicle and recovers regenerative energy of the vehicle. When the first capacitor group discharges electric power preferentially over the second capacitor group, the charge/discharge control device performs control such that the second capacitor group is charged preferentially over the first capacitor group.

6 Claims, 5 Drawing Sheets

(51) Int. Cl.
*B60L 50/60* (2019.01)
*B60L 58/12* (2019.01)
*H01M 10/0525* (2010.01)
*H01M 10/42* (2006.01)
*H01M 10/48* (2006.01)
*H02J 7/14* (2006.01)
*B60L 7/10* (2006.01)
*H02J 7/34* (2006.01)

(52) U.S. Cl.
CPC ... *H01M 10/0525* (2013.01); *H01M 10/4264* (2013.01); *H01M 10/48* (2013.01); *H02J 7/0048* (2020.01); *H02J 7/00712* (2020.01); *H02J 7/1423* (2013.01); *H02J 7/1438* (2013.01); *B60L 7/10* (2013.01); *B60L 2240/14* (2013.01); *H01M 2220/20* (2013.01); *H02J 7/345* (2013.01); *H02J 2207/50* (2020.01)

(58) Field of Classification Search
USPC ......... 307/9.1, 10.7; 318/376, 801; 320/104; 180/65.1; 701/122
See application file for complete search history.

IN-VEHICLE POWER SUPPLY SYSTEM, CHARGE/DISCHARGE CONTROL DEVICE, AND VEHICLE

CROSS-REFERENCE TO RELATED APPLICATIONS

This application is the U.S. National Phase under 35 U.S.C. § 371 of International Application No. PCT/JP2022/014817, filed on Mar. 28, 2022.

TECHNICAL FIELD

The disclosure relates to an in-vehicle power supply system that is to be mounted on a vehicle and in which a lithium ion secondary battery and a lithium ion capacitor are connected in parallel to each other, and to a charge/discharge control device of the in-vehicle power supply system, and a vehicle.

BACKGROUND ART

A lithium ion secondary battery and a lithium ion capacitor are known as chargeable/dischargeable power storage devices mounted on a vehicle. Since the lithium ion secondary battery and the lithium ion capacitor have different advantages and disadvantages from each other, it is expected that the lithium ion secondary battery and the lithium ion capacitor are efficiently used in combination in a parallel state.

For example, PTL 1 discloses that, while a power storage unit, which includes a lithium ion secondary battery, and an auxiliary power storage unit, which includes a lithium ion capacitor, are connected in parallel to each other, a state-of-charge balance between the power storage e units is controlled.

CITATION LIST

Patent Literature

PTL 1: International Publication No. 2014/156564

SUMMARY OF INVENTION

Technical Problem

However, the conventional power storage device disclosed in PTL 1 or the like performs charge/discharge control of the power storage device without sufficiently considering a state of charge (hereafter, also referred to as "SOC") suitable for an acceleration state and a deceleration state of the vehicle. That is, for example, in a situation where the SOC of the lithium ion capacitor is low, the amount of current for the lithium ion secondary battery at the time of acceleration is increased, so that deterioration of the battery is accumulated. As a result, the product life of the lithium ion secondary battery is shortened. In addition, in a situation where the SOC of the lithium ion capacitor is high, since the chargeable capacity in the lithium ion capacitor at the time of regeneration is small, the input to the lithium ion secondary battery becomes high. As a result, the deterioration of the battery progresses in the same manner, or there is no choice but to decelerate by normal braking, and the energy efficiency decreases.

The disclosure has been made in view of the above problem as an example. The disclosure provides an in-vehicle power supply system, a charge/discharge control device for a vehicle, a vehicle, a computer program, and a recording medium on which the computer program is recorded. By the in-vehicle power supply system, the charge/discharge control device for a vehicle, the vehicle, the computer program, and the recording medium, it is possible to maintain, in a power storage device, the state of charge suitable for the acceleration state and the deceleration state of the vehicle. In the power storage device, a lithium ion secondary battery and a lithium ion capacitor are connected in parallel to each other.

Solution to Problem

To solve the above problem, an aspect of the disclosure provides an in-vehicle power supply system including: a first power storage device to be mounted on a vehicle and constituted by one or more lithium ion secondary batteries; a second power storage device connected in parallel to the first power storage device and to be mounted on the vehicle; and a charge/discharge control device configured to control charging/discharging of the first power storage device and the second power storage device to supply electric power to a drive source of the vehicle and recover regenerative energy of the vehicle. The second power storage device is composed of a plurality of lithium ion capacitor groups constituted by a first capacitor group including one or more lithium ion capacitors and a second capacitor group including one or more lithium ion capacitors such that the first capacitor group and the second capacitor group are connected in parallel to each other. The charge/discharge control device is configured to, when the first capacitor group discharges electric power preferentially over the second capacitor group, perform control such that the second capacitor group is charged preferentially over the first capacitor group.

To solve the above problem, an aspect of the disclosure provides a charge/discharge control device to be mounted on a vehicle to control charging/discharging of a first power storage device and a second power storage device that are included in the vehicle. The first power storage device is constituted by one or more lithium ion secondary batteries. The second power storage device is connected in parallel to the first power storage device and composed of a plurality of lithium ion capacitor groups constituted by a first capacitor group including one or more lithium ion capacitors and a second capacitor group including one or more lithium ion capacitors such that the first capacitor group and the second capacitor group are connected in parallel to each other. The charge/discharge control device includes: one or more processors; and one or more memories communicably connected to the one or more processors, in which the one or more processors are configured to obtain acceleration information of the vehicle, obtain state-of-charge information of the first power storage device and state-of-charge information of the second power storage device, and, when the first capacitor group discharges electric power preferentially over the second capacitor group, perform control, based on the acceleration information of the vehicle, such that the second capacitor group is charged preferentially over the first capacitor group.

To solve the above problem, an aspect of the disclosure provides a vehicle including: a first power storage device constituted by one or more lithium ion secondary batteries; a second power storage device connected in parallel to the first power storage device and composed of a plurality of lithium ion capacitor groups constituted by a first capacitor group including one or more lithium ion capacitors and a second capacitor group including one or more lithium ion capacitors such that the first capacitor group and the second capacitor group are connected in parallel to each other; an acceleration information obtainer configured to obtain acceleration information of the vehicle; a state-of-charge information obtainer configured to obtain state-of-charge information of the first power storage device and state-of-charge information of the second power storage device; and a switch controller configured to, when the first capacitor group discharges electric power preferentially over the second capacitor group, perform control, based on the acceleration information of the vehicle, such that the second capacitor group is charged preferentially over the first capacitor group.

Advantageous Effects of Invention

As described above, according to the disclosure, it is possible to perform charge/discharge control of an in-vehicle power supply in consideration of the state of charge suitable for the acceleration state and the deceleration state of the vehicle.

DESCRIPTION OF EMBODIMENTS

Figure 1:
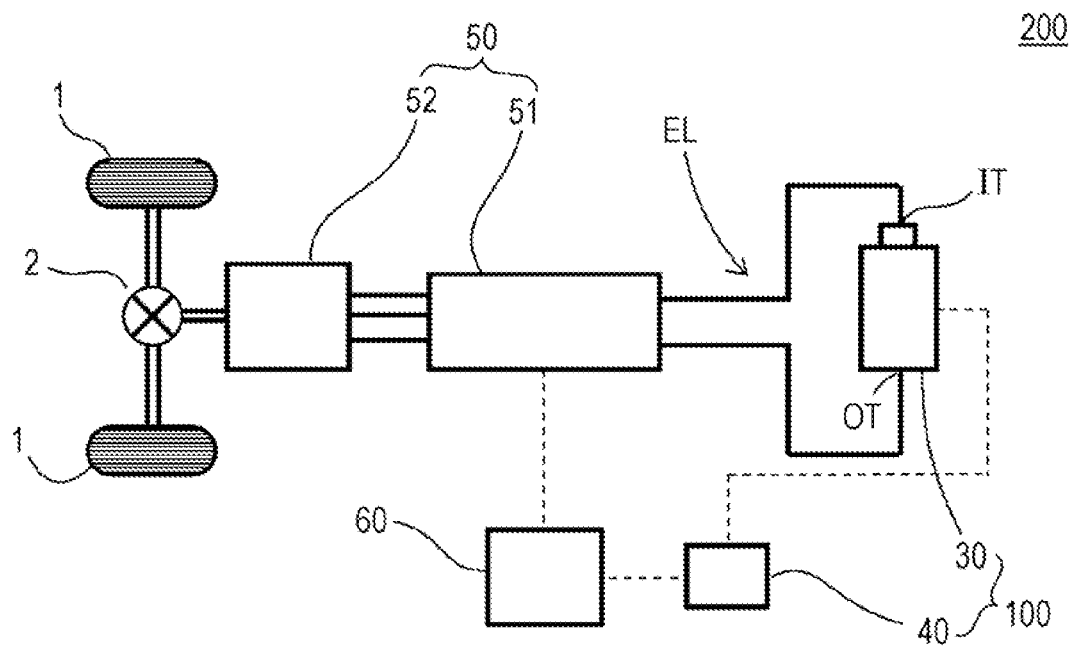
FIG. 1 is a schematic diagram illustrating a configuration example of a vehicle equipped with which an in-vehicle power supply system according to the disclosure.

Hereinafter, a preferred embodiment of the disclosure will be described in detail with reference to the accompanying drawings. In the specification and the drawings, components having substantially the same function and configuration are denoted by the same reference numerals, and redundant description thereof will be omitted.

1-1. In-Vehicle Power Supply System

A configuration example of an in-vehicle power supply system 100 according to an embodiment of the disclosure will be described with reference to FIGS. 1 to 4. FIG. 1 is a schematic diagram illustrating a vehicle 200 equipped with the in-vehicle power supply system 100. Note that an electric vehicle equipped with an electric motor will be illustrated below as an example of the "vehicle". However, the vehicle according to the present embodiment may be a hybrid electric vehicle further using a known engine (internal combustion engine) in combination, or may be an electric vehicle equipped with another known power generation device such as a gas turbine.

As illustrated in FIG. 1, the vehicle 200 according to the present embodiment is equipped with a load 50 that supplies a driving force to wheels 1 serving as drive wheels via a known power transmission mechanism 2 including a differential gear. Hereinafter, a front-wheel drive vehicle (FWD) in which the driving force is supplied from the load 50 to the front wheels among the wheels 1 will be illustrated. However, the present embodiment is not limited to the above case, and may be a rear-wheel drive vehicle (RWD) in which the above-described driving force is supplied to rear wheels, or an all-wheel drive vehicle (AWD) in which the driving force is supplied to all the wheels.

The load 50 includes a known inverter 51 that receives supply of electric power from a power storage device 30 described later, and a known electric motor 52 such as an electric motor that is connected to the inverter 51 and supplies the driving force to the wheels 1 described above.

As illustrated in FIG. 1, the power storage device 30 as an in-vehicle power supply of the present embodiment is connected to the load 50 including the inverter 51 via a power supply line EL having an input terminal IT and an output terminal OT.

Figure 2:
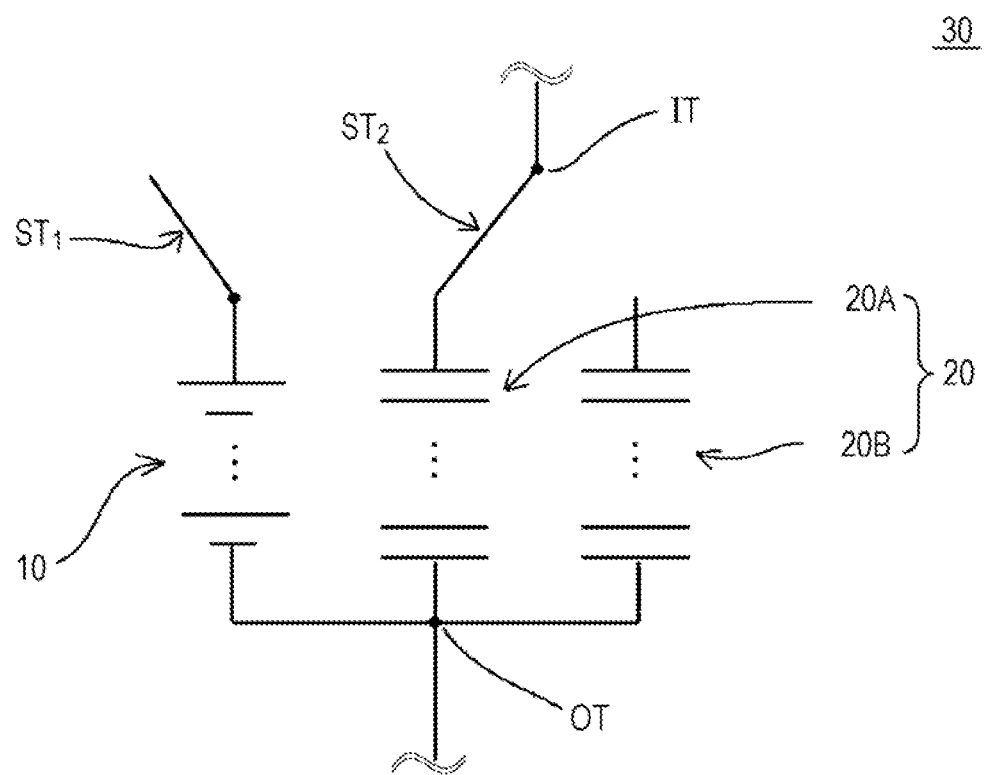
FIG. 2 is a schematic diagram illustrating a first connection pattern of a power storage device according to an embodiment of the disclosure with respect to a load.

The power storage device 30 includes a first power storage device 10 and a second power storage device 20. The first power storage device 10 is constituted by one or more lithium ion secondary batteries LiB. The second power storage device 20 is constituted by a plurality of lithium ion capacitors LiC. Among these, as illustrated in FIG. 2 and the like, the first power storage device 10 is mounted on the vehicle 200, and a plurality of known lithium ion secondary batteries are connected in series in the first power storage device 10.

The second power storage device 20 is connected in parallel to the above-described first power storage device 10 via a known switch circuit ST (a first switch circuit $ST_1$ and a second switch circuit $ST_2$ described later) and is mounted on the vehicle 200. Such a second power storage device 20 includes a first capacitor group 20A and a second capacitor group 20B such that a plurality of known lithium ion capacitors are connected in parallel to each other. The first capacitor group 20A is constituted by one or more lithium ion capacitors and the second capacitor group 20B is constituted by one or more lithium ion capacitors. Note that the two capacitor groups described above are connected in parallel to each other in the second power storage device 20 of the present embodiment. However, a configuration in which any number of three or more capacitor groups are connected in parallel to one another may also be employed.

As illustrated in FIG. 1, the vehicle 200 is equipped with a plurality of control devices that control traveling of the vehicle. The control device of the present embodiment includes a charge/discharge control device 40 and a vehicle drive control device 60. The charge/discharge control device 40 serves as a BMU that controls charging/discharging of the first power storage device 10 and the second power storage device 20 to supply electric power to a drive source (the load 50 or the like) of the vehicle 200 and recover regenerative energy of the vehicle 200. The vehicle drive control device 60 includes one or more known ECUs that are electrically connected to the charge/discharge control device 40 and control the driving of the load 50.

In the present embodiment, the "in-vehicle power supply system" includes the above-described power storage device 30 and the charge/discharge control device 40 that controls the power storage device 30.

The vehicle drive control device 60 has a function of controlling the driving of the vehicle 200 based on state information of the vehicle 200 detected by known vehicle state sensors 62c mounted on the vehicle 200. Such vehicle state sensors 62c are devices that measure information indicating a behavior and an operation state of the vehicle 200. As an example, the vehicle state sensors 62c include one or more of a known vehicle speed sensor, a known acceleration sensor, and a known angular velocity sensor. In addition, the vehicle state sensors may include a known steering angle sensor, a known accelerator pedal sensor, and a known brake pedal sensor.

The vehicle drive control device 60 may have a function of controlling the driving of the vehicle 200, based on position information detected from a known vehicle position detection sensor (not illustrated) mounted on the vehicle 200. An example of such a vehicle position detection sensor is a sensor used in a GNSS (Global Navigation Satellite System) represented by a known GPS (Global Positioning System). The vehicle position detection sensor receives satellite signals transmitted from and satellites, transmits position information of the vehicle 200 included in the satellite signals to the vehicle drive control device 60. The vehicle position detection sensor may also include an antenna that receives satellite signals from another satellite system that identifies the position of the vehicle 200 in addition to the GPS.

The charge/discharge control device 40 and the vehicle drive control device 60 described above include one or more processors and one or more memories. Examples of the one or more processors include a CPU (Central Processing Unit), and examples of the one or more memories include a RAM (Random Access Memory) and a ROM (Read Only Memory) communicably connected to the one or more processors. A part or all of the charge/discharge control device 40 and the vehicle drive control device 60 may be constituted by an updatable device such as firmware, or may be a program module or the like executed by a command from a processor.

The charge/discharge control device 40 functions as a device that controls charging/discharging of the first power storage device 10 and the second power storage device 20 by the one or more processors executing a computer program.

The computer program is a computer program for causing a processor to execute operations that are to be executed by the charge/discharge control device 40 and are described below. The computer program executed by the processor may be recorded on a recording medium functioning as a storage (memory) included in the charge/discharge control device 40. The computer program executed by the processor may also be recorded on a recording medium built in the charge/discharge control device 40 or any recording medium externally attachable to the charge/discharge control device 40.

The recording medium on which the computer program is recorded may be a magnetic medium, an optical recording medium, a magneto-optical medium, a storage element, a flash memory, an SSD (Solid State Drive), or any other medium capable of storing a program. Examples of the magnetic medium include a hard disk, a floppy disk, a magnetic tape, and the like. Examples of the optical recording medium include a CD-ROM (Compact Disk Read Only Memory), a DVD (Digital Versatile Disk), a Blu-ray (registered trademark), and the like. Examples of the magneto-optical medium include a floptical disk and the like. Examples of the storage element include a RAM, a ROM, and the like. Examples of the flash memory include a USB (Universal Serial Bus) memory and the like.

Figure 3:
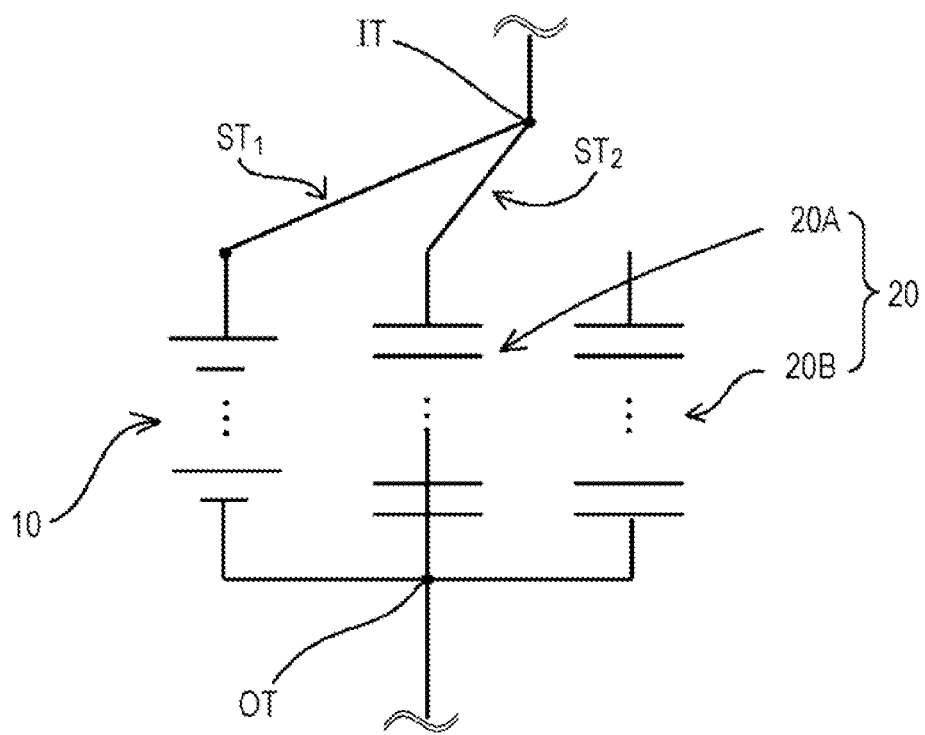
FIG. 3 is a schematic diagram illustrating a second connection pattern of the power storage device according to the embodiment of the disclosure with respect to the load.
Figure 4:
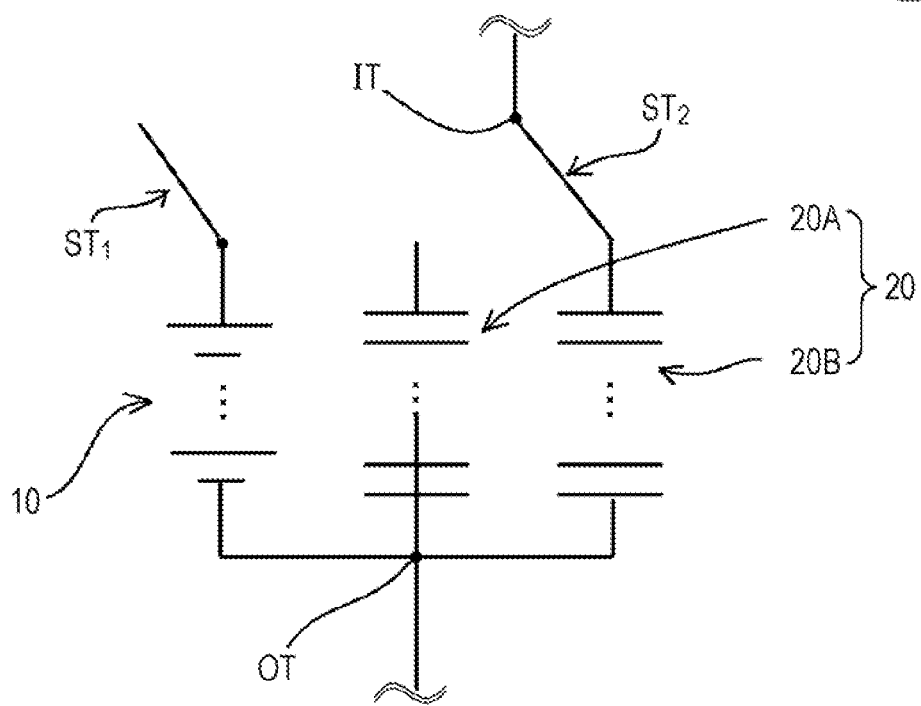
FIG. 4 is a schematic diagram illustrating a third connection pattern of the power storage device according to the embodiment of the disclosure with respect to the load.

The charge/discharge control device 40 controls the electric power supply state from the first power storage device 10 and the second power storage device 20 that are connected in parallel to each other via the above-described switch circuit ST, based on connection patterns illustrated in FIGS. 2 to 4.

For example, as a first connection pattern illustrated in FIG. 2, the charge/discharge control device 40 disconnects the first power storage device 10 from the power supply line EL via the first switch circuit $ST_1$. The charge/discharge control device 40 also connects the input terminal IT and the output terminal OT of the power supply line EL to the first capacitor group 20A of the second power storage device 20 via the second switch circuit $ST_2$. As a result, only the first capacitor group 20A of the power storage device 30 is connected to the load 50 so that electric power can be transmitted and received.

As a second connection pattern illustrated in FIG. 3, the charge/discharge control device 40 connects the first power storage device 10 to the input terminal IT and the output terminal OT of the power supply line EL via the first switch circuit $ST_1$. The charge/discharge control device 40 also connects the input terminal IT and the output terminal OT of the power supply line EL to the first capacitor group 20A of the second power storage device 20 via the second switch circuit $ST_2$. As a result, the first power storage device 10 and the first capacitor group 20A of the power storage device 30 are connected in parallel to the load 50 so that electric power can be supplied to and received. At this time, electric power can also be supplied from the first power storage device 10 to the first capacitor group 20A in the power storage device 30 along with the load 50.

As the third connection pattern illustrated in FIG. 4, the charge/discharge control device 40 disconnects the first power storage device 10 from the power supply line EL via the first switch circuit $ST_1$. The charge/discharge control device 40 also connects the input terminal IT and the output terminal OT of the power supply line EL to the second capacitor group 20B of the second power storage device 20 via the second switch circuit $ST_2$. As a result, only the second capacitor group 20B of the power storage device 30 is connected to the load 50 so that electric power can be supplied and received.

As described above, the charge/discharge control device 40 of the present embodiment can appropriately switch between at least the states of the first connection pattern to the third connection pattern described above via the switch circuit ST. Thus, the charge/discharge control device 40 can form a state in which electric power can be supplied and received between the load 50 and the power storage device 30.

1-2. Configuration of Charge/Discharge Control Device

Next, the configuration of the charge/discharge control device 40 in the present embodiment will be described with reference to FIG. 5.

Figure 5:
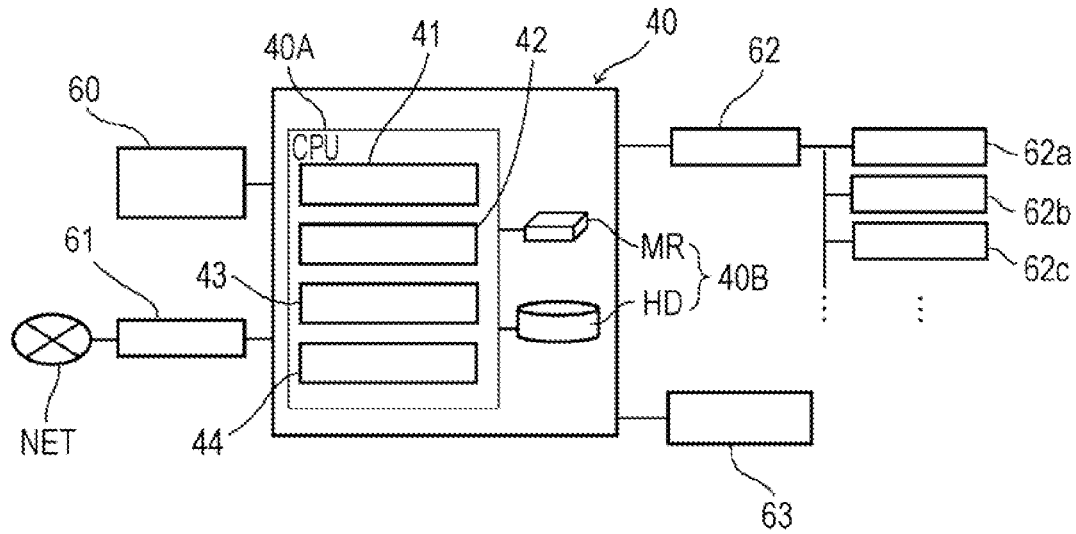
FIG. 5 is a block diagram of a charge/discharge control device in a vehicle according to the embodiment of the disclosure.

As can be seen from FIG. 5, the charge/discharge control device 40 of the present embodiment includes a processor 40A and a storage 40B.

The processor 40A is constituted by one or more processors such as CPUs, and includes an acceleration information obtainer 41, an SOC monitor 42, a switch controller 43, and a display controller 44. Each of the units included in the processor 40A is a function implemented by the above-described one or more processors executing a program. However, a part of the acceleration information obtainer 41, the SOC monitor 42, the switch controller 43, and the display controller 44 may also be constituted by a known analog circuit.

As described above, the processor 40A may be configured to be capable of communication with the vehicle drive control device 60 constituted by another known in-vehicle ECU. The vehicle drive control device 60 may have a function of controlling the driving of the charge/discharge control device 40, based on detection values of the known vehicle state sensors 62c. Examples of the known vehicle state sensors 62c include a vehicle speed sensor, an acceleration sensor, an angular velocity sensor, a steering angle sensor, an accelerator pedal sensor, and a brake pedal sensor.

In addition, the processor 40A may be configured to be capable of information communication with a known external network NET such as the Internet via a known in-vehicle communication device 61.

The storage 40B may include a known memory MR that temporarily stores information, such as a RAM, and a known hard disk HDD or SSD that can store a program and the like. The storage 40B according to the present embodiment may store obtained data, operation result data, and the like in addition to a program executed by the processor 40A and various parameters used for execution of the program.

Hereinafter, functions of the acceleration information obtainer 41, the SOC monitor 42, the switch controller 43, and the display controller 44 of the processor 40A will be briefly described, and then processing operations performed by the respective units will be described in detail.

Acceleration Information Obtainer

The acceleration information obtainer 41 executes a process of obtaining acceleration information in the vehicle 200 during traveling. For example, the acceleration information obtainer 41 detects the accelerations of the vehicle 200 during traveling via an accelerometer (vehicle-state sensor 62c) provided in the vehicle 200. Note that the acceleration information obtainer 41 may calculate the acceleration of the vehicle 200 during traveling, based on the speed information from the vehicle speed sensor (another vehicle-state sensor 62c) of the vehicle 200.

SOC Monitor

The SOC monitor 42 performs a process of detecting and monitoring the SOC (state of charge) of each of the first power storage device 10 and the second power storage device 20 mounted on the vehicle 200 via an in-vehicle current sensor 62a and an in-vehicle voltage sensor 62b. Note that a specific method of detecting the SOCs by the SOC monitor 42 is not limited a particular method without departing from the gist of the present embodiment. Various known SOC estimation techniques such as those disclosed in Japanese Unexamined Patent Application Publication No. 2021-68637 and International Publication No. 2019/193471 may be applied.

Switch Controller

The switch controller 43 executes a process of switching the connection state of the first power storage device 10 and the second power storage device 20 with respect to the load 50 described above. For example, the switch controller 43 can control the switch circuit ST (the first switch circuit $ST_1$ and the second switch circuit $ST_2$) described above. Thus, the connection state between the power storage device 30 and the load 50 becomes any one of the first connection pattern to the third connection pattern via the switch circuit ST.

Display Controller

The display controller 44 executes a process of displaying, on a display device 63, various kinds of information such as the connection state of the power storage device 30 with respect to the load 50. Here, as an example of the display device 63 of the present embodiment, a known in-vehicle display can be given. Note that the display controller 44 may indicate the above-described various kinds of information by voice on an in-vehicle speaker, or may display the information on an external terminal such as a smartphone carried by an occupant.

1-3. Charge/Discharge Processing Operation of In-Vehicle Power Supply System Including Charge/Discharge Control Device Next, with reference to FIGS. 6 to 8, an example of a charge/discharge processing operation performed by the in-vehicle power supply system 100 including the charge/discharge control device 40 of the present embodiment will be described.

In this example, as examples of an initial state of the power storage device 30, the first power storage device 10 is in a fully charged state (SOC 100%). In addition, the first capacitor group 20A of the second power storage device 20 is in a fully charged state (SOC 100%). Furthermore, the second capacitor group 20B of the second power storage device 20 is in an empty state (SOC 0%). The above-described states of the SOCs are examples, and the SOCs in the power storage device 30 may be set to any initial states.

Various capacities can be set for the first capacitor group 20A and the second capacitor group 20B described above without departing from the gist of the present embodiment. As an example, the capacities of the first capacitor group 20A and the second capacitor group 20B may be set to a capacity sufficient for one acceleration of 100 km/h from the start of the vehicle 200.

In this example, the second power storage device 20 in the fully charged state (SOC 100%) described above is set as an output capacitor LiC-1. In addition, the second power storage device 20 in the empty state (SOC 0%) is set as an input capacitor LiC-2. Although the SOC of the output capacitor LiC-1 is set to 100% in the present embodiment, the output capacitor does not necessarily have an SOC of 100%. For example, a capacitor group having the relatively higher SOC than the other capacitor group may be set as the output capacitor. Similarly, although the SOC of the input capacitor LiC-2 is set to 0% in the present embodiment, the input capacitor does not necessarily have an SOC of 0%. For example, a capacitor group having the relatively lower SOC than the other capacitor group may be set as the input capacitor.

Note that the "output capacitor" in the present embodiment refers to a capacitor group that preferentially supplies electric power to the load 50 among the first capacitor group 20A and the second capacitor group 20B. In addition, the "input charge capacitor" in the present embodiment refers to a capacitor group that preferentially receives regenerative charging from the load 50 among the first capacitor group 20A and the second capacitor group 20B. Since the "output capacitor" and the "input capacitor" are functions determined by the magnitude of the SOC with respect to the other capacitor group, the above-described functions may be appropriately interchanged during the operation of the vehicle 200 or the like.

In the following description, a travel pattern A and a travel pattern B illustrated in FIG. 8 will be described as examples of travel patterns of the vehicle 200.

Figure 8:
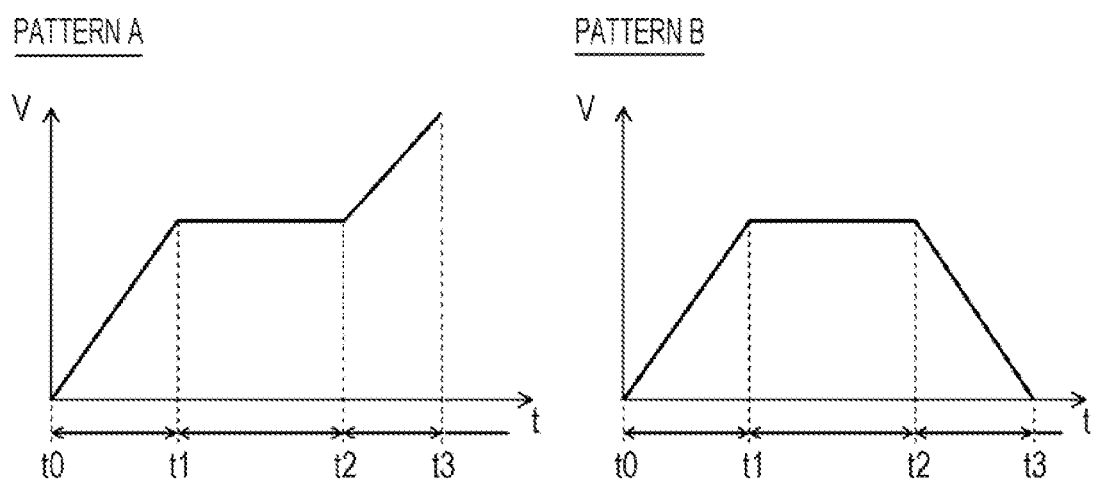
FIG. 8 is a schematic diagram illustrating an example of a travel pattern of a vehicle.

As illustrated in FIG. 8, the travel pattern A illustrates the following example. The vehicle 200 starts from time to and accelerates to time t1, then travels at a constant speed (0 acceleration) from time t1 to time t2, and then accelerates again from time t2 to time t3.

On the other hand, the travel pattern B illustrates the following example. The vehicle 200 starts from time to and accelerates to time t1, then travels at a constant speed (0 acceleration) from time t1 to time t2, then decelerates (negatively accelerates) from time t2, and finally stops at time t3.

Figure 6:
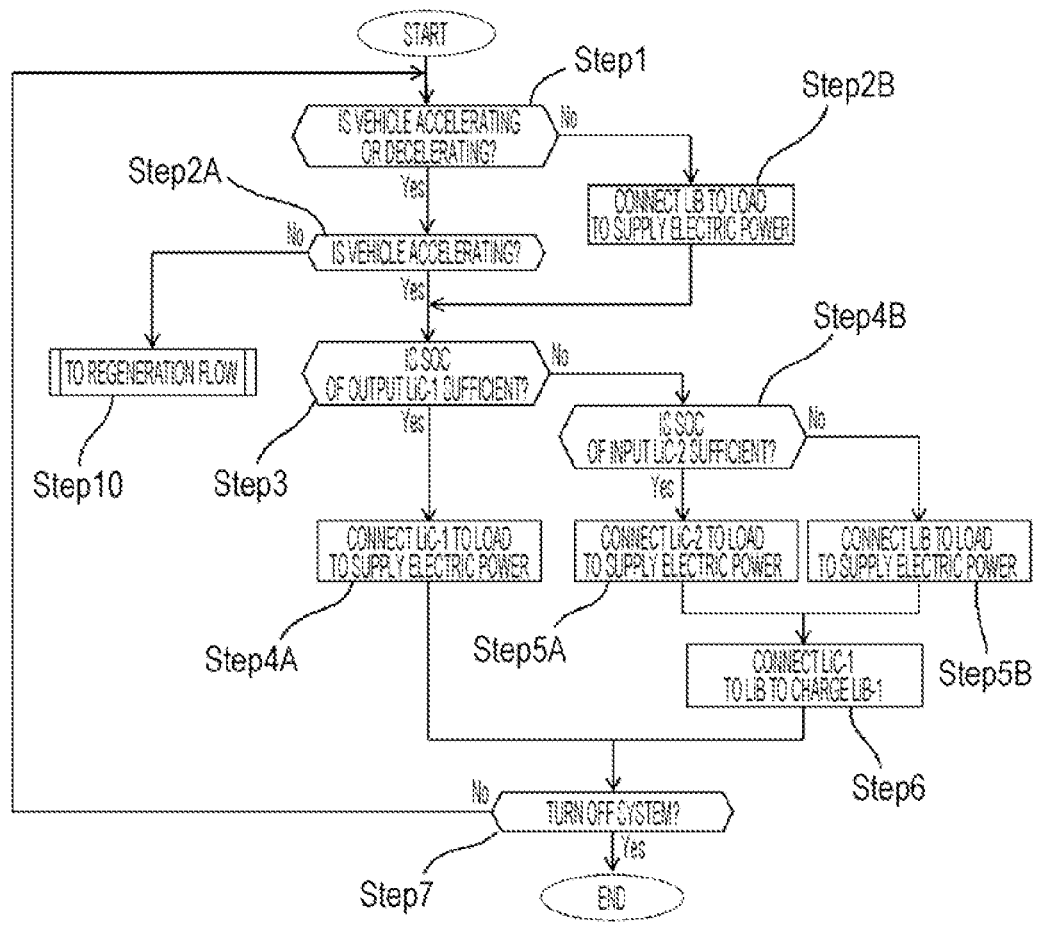
FIG. 6 is a flowchart illustrating a charge/discharge control method for an in-vehicle power supply by a charge/discharge control device according to the embodiment of the disclosure.

Referring also to FIG. 6, first, the connection state between the power storage device 30 and the load 50 in a case where the vehicle 200 travels according to the travel pattern A among the above-described travel patterns will be described.

(α) Acceleration Period from Time t0 to Time t1

In step 1, the charge/discharge control device 40 determines whether the vehicle 200 is accelerating or decelerating. For example, the charge/discharge control device 40 can determine whether the vehicle 200 is accelerating or decelerating from time t0 to time t1 via the vehicle state sensors 62c described above. If the vehicle 200 is accelerating or decelerating in step 1, the process proceeds to step 2A.

Figure 7:
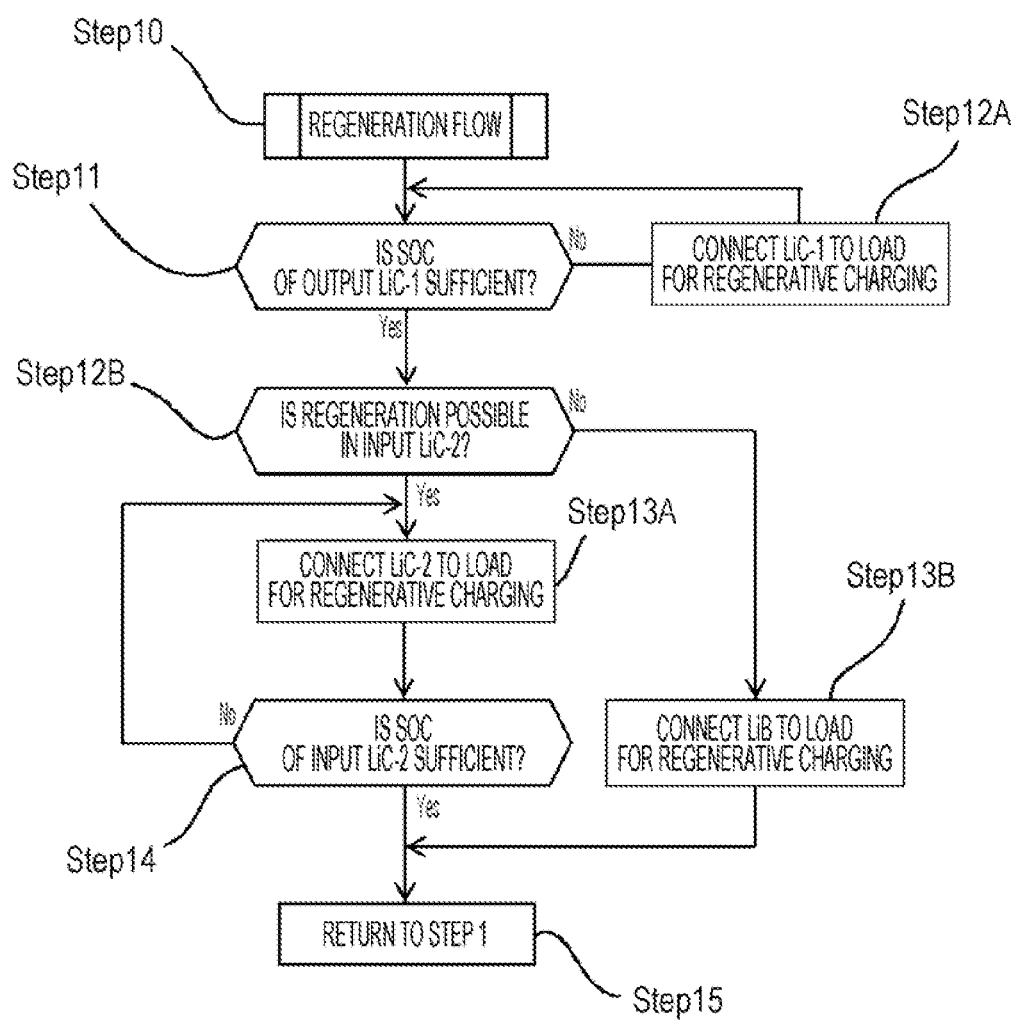
FIG. 7 is a flowchart at the time of regenerative charging in the charge/discharge control method by the charge/discharge control device according to the embodiment of the disclosure.

If it is determined in step 2A that the vehicle is not accelerating but decelerating, the process proceeds to a regeneration flow illustrated in FIG. 7. As illustrated in FIG. 8, in this example, since the vehicle 200 is in an acceleration period from time t0 to time t1, the charge/discharge control device 40 determines whether the SOC of the output capacitor LiC-1 is sufficient in the subsequent step 3. The determination standard in step 3 may be, for example, whether there is a capacitance sufficient for one acceleration of 100 km/h from the start of the vehicle 200. The determination standard in step 3 may also be, for example, whether the SOC is a predetermined state of charge (80% or more).

As described above, in this example, since the SOC of the output capacitor LiC-1 is in the fully charged state, the charge/discharge control device 40 executes a process of connecting the output capacitor LiC-1 to the load 50 to supply electric power in step 4A. For example, in step 4A, the charge/discharge control device 40 controls switching of the switch circuit ST so as to establish the first connection pattern illustrated in FIG. 2.

In this manner, during the acceleration period from time t0 to time t1, the above-described process is repeated, and electric power is supplied from the output capacitor LiC-1 to the load 50. In other words, if the vehicle 200 is accelerating, the charge/discharge control device 40 disconnects the first power storage device 10 from the load 50 of the vehicle 200. In addition, the charge/discharge control device 40 connects the load 50 and the first capacitor group (in this example, the output capacitor LiC-1) to each other so that the first capacitor group can discharge electric power. Thus, when the vehicle 200 accelerates, electric power can be supplied to the load 50 not from the first power storage device 10 but from the second power storage device 20, and deterioration of the first power storage device 10 is suppressed.

(b) Constant Speed Period from Time t1 to Time t2

Similarly to the above, in step 1, the charge/discharge control device 40 determines whether the vehicle 200 is accelerating or decelerating. In this case, since the vehicle 200 is traveling at a constant speed without accelerating or decelerating, in step 2B, the charge/discharge control device 40 performs control to connect the first power storage device 10 (lithium ion secondary battery LiB) to the load 50 and supply electric power from the first power storage device 10 to the load 50.

After connecting the first power storage device 10 and the load 50 to each other in step 2B, in the subsequent step 3, the charge/discharge control device 40 determines whether the SOC of the output capacitor LiC-1 is sufficient. In this example, as described above, electric power is supplied from the output capacitor LiC-1 to the load 50 from time t0 to time t1, and the SOC of the output capacitor LiC-1 is not sufficient. Therefore, the process proceeds to step 4B. In step 4B, the charge/discharge control device 40 determines whether the SOC of the input capacitor LiC-2 is sufficient. Note that the determination standard in step 4B may be, for example, the same as that in step 3 described above.

In this example, since the SOC of the input capacitor LiC-2 is in the empty state, the charge/discharge control device 40 proceeds to step 5B, maintains the state in step 2B, and continues electric power supply from the first power storage device 10 to the load 50. After step 5B, in the subsequent step 6, the charge/discharge control device 40 performs a process of connecting the output capacitor LiC-1 to the first power storage device 10 to charge the output capacitor LiC-1. For example, the charge/discharge control device 40 performs a process of switching the switch circuit ST to establish the second connection pattern illustrated in FIG. 3.

Thus, in a low-load period during which the vehicle 200 is traveling at a constant speed, electric power can be supplied from the first power storage device 10 to the load 50 and the output capacitor LiC-1. Thus, the SOC of the output capacitor LiC-1 can be recovered to prepare for the next acceleration. As described above, in the present embodiment, the input capacitor LiC-2 is controlled to be in a low charge state (in this example, the empty state) in a case where the output capacitor LiC-1 constituting the second power storage device 20 is in a high charge state (in this example, the SOC is 100%). In other words, if the vehicle 200 is neither accelerating nor decelerating, the charge/discharge control device 40 connects one of the first capacitor group and the second capacitor group to the first power storage device 10 for charging from the first power storage device 10. In this manner, the states of charge of the first capacitor group and the second capacitor group can be in opposite states.

(c) Reacceleration Period from Time t2 to Time t3

Similarly to the above, in step 1, the charge/discharge control device 40 determines whether the vehicle 200 is accelerating or decelerating. In this case, since the vehicle 200 starts to accelerate again, the charge/discharge control device 40 determines in step 2A that the vehicle 200 is accelerating. In addition, the charge/discharge control device 40 determines in the subsequent step 3 whether the SOC of the output capacitor LiC-1 is sufficient. In this example, as described above, electric power is supplied from the load 50 to the output capacitor LiC-1 from time t1 to time t2, and the SOC of the output capacitor LiC-1 is sufficient. Therefore, the process proceeds to step 4A, and control is performed to switch the switch circuit ST again so as to establish the first connection pattern illustrated in FIG. 2.

In this manner, during the reacceleration period from time t2 to time t3, the above-described process is repeated, and electric power is supplied again from the output capacitor LiC-1 to the load 50.

As described above, the charge/discharge control device 40 of the present embodiment controls the switch circuit ST. Thus, the first capacitor group and the second capacitor group of the second power storage device 20 connected in parallel to the first power storage device 10 are in mutually different charge states (the fully charged state and the empty state). In other words, the charge/discharge control device 40 performs control such that the second capacitor group (input capacitor) is charged preferentially over the first capacitor group (output capacitor). This control is performed when the parallel-connected first capacitor group (output capacitor) discharges electric power preferentially over the second capacitor group (input capacitor).

Thus, even when the vehicle travels on a climbing lane or the like in which acceleration and constant speed are repeated as in the travel pattern A, it is possible to suppress the load applied to the first power storage device 10 and prevent deterioration of the first power storage device 10. The deterioration of the first power storage device 10 can be prevented as compared with the case where the second power storage device 20 connected in parallel to the first power storage device 10 is a single capacitor group.

Note that the following process can be performed. In a case where the SOC of the second capacitor group becomes the fully charged state by regenerative charging of the second capacitor group described later, as illustrated in FIG. 6, if the SOC of the output capacitor LiC-1 is not sufficient, electric power can be supplied from the input capacitor LiC-2 to the load 50. In this manner, the charge/discharge control device 40 may control the charging/discharging such that the state of charge (SOC) in the second capacitor group becomes lower than that in the first capacitor group. This control is performed in a case where the state of charge (SOC) in the second capacitor group is higher than that in the first capacitor group.

Next, with reference to FIGS. 6 and 7, the connection state between the power storage device 30 and the load 50 in a case where the vehicle 200 travels according to the travel pattern B among the above-described travel patterns will be described. Note that the period from time t0 to time t2 in the travel pattern B is the same as that in the travel pattern A described above, and therefore description thereof is omitted.

(d) Deceleration Period from Time t2 to Time t3

Similarly to the above, in step 1, the charge/discharge control device 40 determines whether the vehicle 200 is accelerating or decelerating. In this case, the vehicle 200 starts to decelerate. Thus, the charge/discharge control device 40 determines in step 2A that the vehicle 200 is not accelerating (i.e., decelerating), and proceeds to the regeneration flow as step 10 illustrated in FIG. 7.

As illustrated in FIG. 7, in step 11, the charge/discharge control device 40 determines whether the SOC of the output capacitor LiC-1 is sufficient. Note that, for example, the determination standard illustrated in step 3 described above may be applied to the determination standard in step 11. If the SOC of the output capacitor LiC-1 is not sufficient in step 11, the charge/discharge control device 40 connects the output capacitor LiC-1 to the load 50 via the switch circuit ST in step 12A. Thus, the charge/discharge control device 40 performs regenerative charging of the output capacitor LiC-1.

On the other hand, if the SOC of the output capacitor LiC-1 is sufficient in step 11, the charge/discharge control device 40 determines whether regenerative charging is possible in the input capacitor LiC-2 in the subsequent step 12B. Note that the determination standard in step 12B may be, for example, whether the input capacitor LiC-2 can be charged with a capacitance sufficient for one acceleration of 100 km/h from the start of the vehicle 200. The determination standard in step 12B may also be, for example, whether the SOC is a predetermined state of charge (10% or less).

If regenerative charging is not possible in the input capacitor LiC-2 in step 12B, the charge/discharge control device 40 executes a process of connecting the first power storage device 10 and the load 50 to each other via the switch circuit ST in the subsequent step 13B. In this case, regenerative charging is performed from the load 50 to the first power storage device 10 during the above-described deceleration of the vehicle 200.

On the other hand, if regenerative charging is possible in the input capacitor LiC-2 in step 12B, the charge/discharge control device 40 executes a process of connecting the input capacitor LiC-2 and the load 50 to each other via the switch circuit ST in the subsequent step 13A. In this manner, the third connection pattern illustrated in FIG. 4 is established. In other words, if the vehicle 200 is decelerating, the charge/discharge control device 40 disconnects the first power storage device 10 from the load 50 of the vehicle 200. In addition, the charge/discharge control device 40 connects the load 50 and the second capacitor group to each other for regenerative charging. In this case, regenerative charging is performed from the load 50 to the second capacitor group 20B of the second power storage device 20 during the above-described deceleration of the vehicle 200.

As illustrated in FIG. 7, in step 14 following step 13A, the charge/discharge control device 40 determines whether the SOC of the input capacitor LiC-2 is sufficient. If the SOC of the input capacitor LiC-2 is determined to be sufficient in step 14, the charge/discharge control device 40 returns to step 1 and repeats the above-described process (step 15). In this manner, during the deceleration period from time t2 to time t3, the above-described process is repeated, and regenerative charging from the load 50 is appropriately performed on either one of the first power storage device 10 and the second power storage device 20.

As described above, the in-vehicle power supply system 100 including the charge/discharge control device 40 according to the embodiment of the disclosure has the following features. If the parallel-connected first group of lithium ion capacitors (in this example, output capacitors) discharge electric power preferentially over the second group (input capacitors), the second group of lithium ion capacitors are charged preferentially over the first group. Thus, acceleration/deceleration of the vehicle 200 can be performed by using the second power storage device 20, which is constituted by lithium ion capacitors, while suppressing deterioration of the first power storage device 10, which is constituted by lithium ion secondary batteries, due to charging/discharging.

The preferred embodiment of the disclosure has been described above in detail with reference to the accompanying drawings, but the technology of the disclosure is not limited to such examples. It is clear that a person having ordinary skill in the art can conceive of various modifications or corrections within the technical idea described in the claims. It is to be understood that these are naturally included in the technical scope of the disclosure.

REFERENCE SIGNS LIST 1 wheel
2 power transmission mechanism
10 first power storage device (lithium ion secondary battery)
20 second power storage device (lithium ion capacitor)
30 power storage device
40 charge/discharge control device
50 load
60 vehicle control device
61 communication device
62a in-vehicle current sensor
62b in-vehicle voltage sensor
62c vehicle state sensor
63 display device
100 in-vehicle power supply system
200 vehicle

The invention claimed is:

1. An in-vehicle power supply system comprising:
a first power storage device to be mounted on a vehicle and constituted by one or more lithium ion secondary batteries;
a second power storage device connected in parallel to the first power storage device and to be mounted on the vehicle, the second power storage device being composed of a plurality of lithium ion capacitor groups constituted by a first capacitor group including one or more lithium ion capacitors and a second capacitor group including one or more lithium ion capacitors such that the first capacitor group and the second capacitor group are connected in parallel to each other; and
a charge and discharge control device configured to control charging and discharging of the first power storage device and the second power storage device to supply electric power to a drive source of the vehicle and recover regenerative energy of the vehicle, wherein
the charge and discharge control device is configured to, when the first capacitor group discharges electric power preferentially over the second capacitor group, perform control such that the second capacitor group is charged preferentially over the first capacitor group.

2. The in-vehicle power supply system according to claim 1, wherein
the charge and discharge control device is configured to, when a state of charge (SOC) in the second capacitor group is higher than a state of charge (SOC) in the first capacitor group, control the charging and discharging such that the state of charge (SOC) in the second capacitor group becomes lower than the state of charge (SOC) in the first capacitor group.

3. The in-vehicle power supply system according to claim 1, wherein
the charge and discharge control device is configured to;
when the vehicle is decelerating, disconnect the first power storage device from a load of the vehicle and connect the load and the second capacitor group to each other for regenerative charging; and
when the vehicle is accelerating, disconnect the first power storage device from the load of the vehicle and connect the load and the first capacitor group to each other to discharge electric power from the first capacitor group.

4. A charge and discharge control device to be mounted on a vehicle to control charging and discharging of a first power storage device and a second power storage device that are included in the vehicle, the first power storage device being constituted by one or more lithium ion secondary batteries, the second power storage device being connected in parallel to the first power storage device and composed of a plurality of lithium ion capacitor groups constituted by a first capacitor group including one or more lithium ion capacitors and a second capacitor group including one or more lithium ion capacitors such that the first capacitor group and the second capacitor group are connected in parallel to each other, the charge and discharge control device comprising:
one or more processors; and
one or more memories communicably connected to the one or more processors, wherein
the one or more processors are configured to:
obtain acceleration information of the vehicle;
obtain state-of-charge information of the first power storage device and state-of-charge information of the second power storage device; and
when the first capacitor group discharges electric power preferentially over the second capacitor group, perform control, based on the acceleration information of the vehicle, such that the second capacitor group is charged preferentially over the first capacitor group.

5. A vehicle comprising:
a first power storage device constituted by one or more lithium ion secondary batteries;
a second power storage device connected in parallel to the first power storage device and composed of a plurality of lithium ion capacitor groups constituted by a first capacitor group including one or more lithium ion capacitors and a second capacitor group including one or more lithium ion capacitors such that the first capacitor group and the second capacitor group are connected in parallel to each other;
an acceleration information obtainer configured to obtain acceleration information of the vehicle;
a state-of-charge information obtainer configured to obtain state-of-charge information of the first power storage device and state-of-charge information of the second power storage device; and
a switch controller configured to, when the first capacitor group discharges electric power preferentially over the second capacitor group, perform control, based on the acceleration information of the vehicle, such that the second capacitor group is charged preferentially over the first capacitor group.

6. The in-vehicle power supply system according to claim 2, wherein
the charge and discharge control device is configured to:
when the vehicle is decelerating, disconnect the first power storage device from a load of the vehicle and connect the load and the second capacitor group to each other for regenerative charging, and when the vehicle is accelerating, disconnect the first power storage device from the load of the vehicle and connect the load and the first capacitor group to each other to discharge electric power from the first capacitor group.

* * * * *